United States Patent Office 3,461,965
Patented Aug. 19, 1969

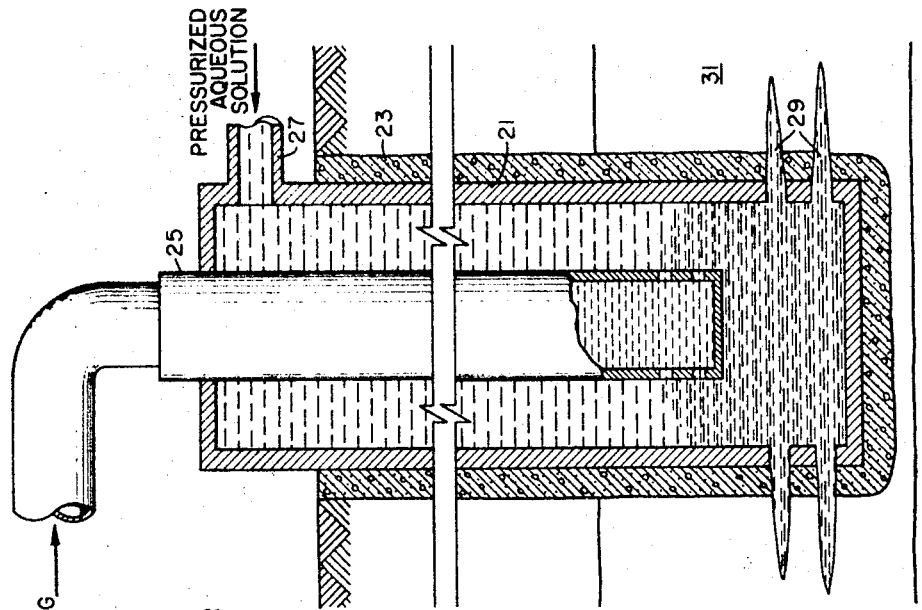
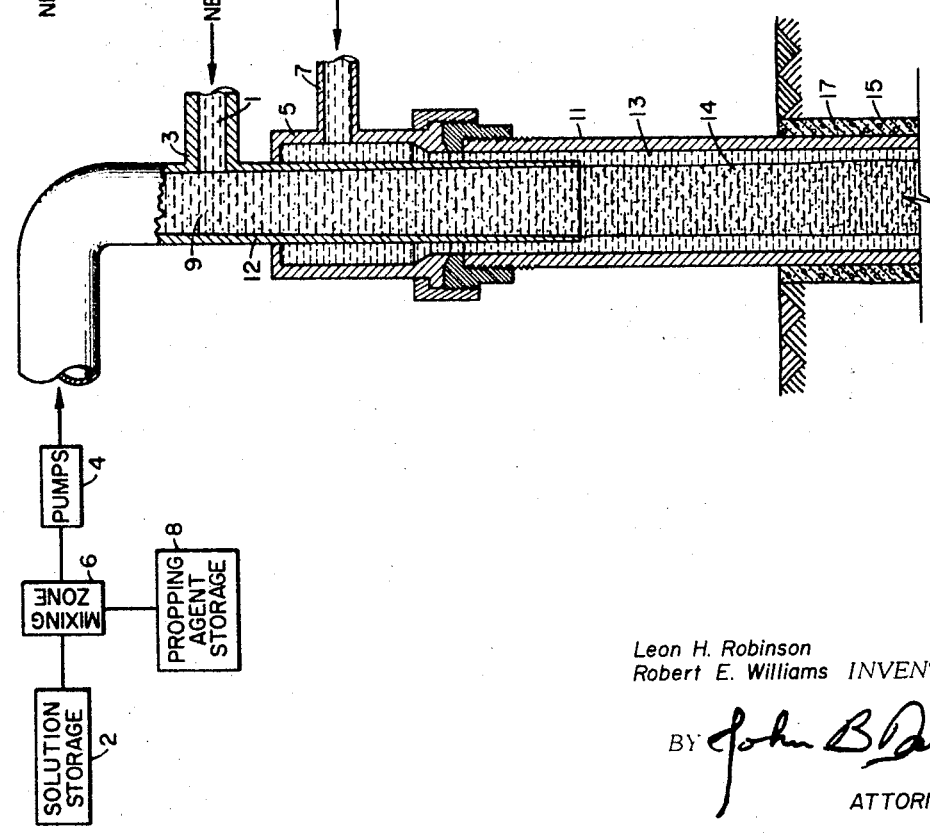

---

3,461,965
FRACTURING OF EARTH FORMATIONS
Leon H. Robinson and Robert E. Williams, Houston, Tex., assignors to Esso Production Research Company, a corporation of Delaware
Filed June 29, 1967, Ser. No. 649,894
Int. Cl. E21b 43/26
U.S. Cl. 166—308                                                      10 Claims

ABSTRACT OF THE DISCLOSURE

An earth formation is fractured by producing a high pressure stream of a pH-sensitive water thickener at a low pH, and before injection of the stream into the formation, increasing the viscosity by raising the pH of the stream. The pH may be increased at the earth's surface by adding a neutralizing agent to the stream, in which case an annular ring of oil is formed between the well pipe and the stream to reduce pressure drop in the well pipe. The preferred stream content is an aqueous solution of carboxy vinyl polymer. Neutralizing agents may be inorganic salts and bases, and nonamine salts and bases.

BACKGROUND OF THE INVENTION

This invention relates generally to the fracturing of earth formations for the purpose of facilitating the recovery of formation fluids therefrom, and more particularly to an improved method for subjecting an earth formation to a highly viscous liquid under very high pressure. Another aspect of the invention relates to an improved fluid for fracturing earth formations.

It has been known for many years that the recovery of formation fluids from earth formations can be enhanced by subjecting the formation to a viscous fluid under high pressure so as to fracture the formation and thereby facilitate the flow of formation fluids to a wellbore.

The success of the fracturing process is largely dependent on the viscosity of the fracturing fluid since low viscosity fluids tend to permeate earth formations rather than fracture them. Unfortunately, fluids with high viscosity can be pumped only with difficulty, and the maximum pressures that can be achieved diminish rapidly as fluid viscosity increases. Furthermore, the pressure drop down a well pipe tends to increase with increasing fluid viscosity so that the effective fracturing pressure at the formation declines even though non-Newtonian fluids are used.

SUMMARY OF THE INVENTION

In accordance with one aspect of the present invention, a formation is fractured by initially producing a high pressure stream of an aqueous solution of a pH-sensitive water thickener having a pH to produce a viscosity less than 100 cp. Preferably, the thickener is carboxy vinyl polymer having a pH less than 3, laden with a suitable fracture propping agent. Prior to injection of the stream into the formation to be fractured, the pH of the aqueous solution is increased to produce a viscosity greater than 200 cp. With carboxy vinyl polymer as the thickening agent, the pH is increased to at least 4. Carboxy vinyl polymer solution immediately increases in viscosity from much less than 100 cp. to a viscosity of 2000 cp. or more (in some cases as high as 70,000 cp.) to act as an effective agent for fracturing earth formations wen the pH is varied from slightly less than pH 3 to pH 4 or more. When the carboxy vinyl polymer's pH is increased at the wellhead, the pressure drop from the wellhead to the earth formation can be tremendously lowered by producing an annular stream of low viscosity oil between the carboxy vinyl polymer solution and the interior surface of the well pipe that is used for conducting the mixture to the earth formation to be fractured. In another embodiment of the invention, the solution of carboxy vinyl polymer is conducted to the vicinity of the earth formation within one of a pair of well pipes and the neutralizing agent therefor is conducted to the vicinity of the earth formation in another well pipe. The carboxy vinyl polymer and the neutralizing agent are mixed immediately before being injected into the earth formation.

The preferred fracturing agent comprises an aqueous solution of carboxy vinyl polymer in the range of 0.01 to 5.0 weight percent of carboxy vinyl polymer and between 0.1 to 5.0 equivalents of a neutralizing agent therefor. Preferably the neutralizing agent is sodium hydroxide in the range of 0.8 to 1.2 equivalents of NaOH equivalent of polymer in solution. By the term "equivalents" is meant an amount of base required to completely neutralize the amount of carboxy vinyl polymer present in solution.

Objects and features of the invention not apparent from the above discussion will become evident upon consideration of the following detailed description of the invention, when taken in connection with the accompanying drawing.

BRIEF DESCRIPTION OF THE DRAWING

In the drawing:
FIG. 1 is a partial view of a well installation, partially in section, illustrating well apparatus for practicing an embodiment of the invention; and
FIG. 2 is a schematic view of a well installation, partially in section, illustrating apparatus for practicing another aspect of the invention.

DESCRIPTION OF THE PREFERRED EMBODIMENT

The present invention is based on the use of pH-sensitive water thickeners, preferably carboxy vinyl polymers (i.e., partially hydrolyzed or fully hydrolyzed polyacrylamides). A preferred carboxy vinyl polymer is polyvinylcarboxylic acid. The polymers are used in connection with the invention in an aqueous solution of about 0.01 to 5.0 weight percent of polymer to water. Inasmuch as dry polymer tends to form clumps of particles when haphazardly dispersed, the polymers should be strongly agitated in order to enhance the rate at which the polymer goes into solution. Assuming the use of a carboxy vinyl polymer as the thickening agent, the acidity of the resulting solution should be less than pH 3 so that the viscosity thereof is less than 100 cp. and preferably less than 10 cp. With reference to FIG. 1, a solution formed as described above may be stored in a storage zone 2, from which it is passed to a mixing zone 3 where it is mixed with a fracture propping agent from storage zone 8. The mixture is pressurized in pumping zone 4 to a suitable high pressure for fracturing purposes, from which zone 4 it is passed to a wellhead assembly comprising a pair of concentric tubular members 11 and 12. The upper end of tubular member 11 surrounds the lower portion of tubular member 12. Preferably the upper end of member 1 is in sealing engagement with member 12. A stream of neutralizer fluid (i.e., a fluid that will increase the pH of the stream from pumping zone 4) is introduced into the tubular member 12 through a pipe 3 which communicates with the interior of tubular member 12 so that the neutralizer fluid can be injected into the flowing stream passing through the member 12. The neutralizing agent may be an inorganic base or salt such as ammonium hydroxide, sodium hydroxide, sodium carbonate, or potassium hydroxide, or a suitable organic base or salt capable of increasing the pH of the solution to at least pH 4. A motor-driven paddle or other mixing device (not shown)

may be incorporated in the apparatus at or near the opening of pipe 3 into tubular member 12 to promote mixing of the neutralizing agent and the stream from pumping zone 4. An oil, such as lease crude or diesel oil, is injected into the upper end of tubular member 11 above the lower end of tubular member 12. The oil is introduced under pressure and will flow down the tubular member 11 as an annular stream between the aqueous solution of carboxy vinyl polymer and the interior surface of the tubular member 11. The effect of the annular stream of oil is to act as a lubricant for the solution of carboxy vinyl polymer. Inasmuch as the viscosity of the carboxy vinyl polymer solution rises very rapidly when the the pH thereof is increased to above pH 3 and inasmuch as the amount of neutralizer added to the stream through pipe 3 should be sufficient in amount to raise the pH of the stream to above pH 4 and preferably between pH 5 and pH 8, the stream will be extremely viscous as it passes through the lower end of tubular member 12. Even though shear effect will tend to lower frictional losses, it is very important to minimize such friction and thus minimize pressure drop of the solution of carboxy vinyl polymer as it passes down the tubing to the level of the formation that is to be fractured. The annular stream of oil will be found to function very well for this purpose. When the solution of carboxy vinyl polymer and oil reaches the bottom of the tubing or casing, it will pass through either the lower open end of the tubular member or through perforations therein, as the case may be, and is subjected under high pressure against the formation to be fractured. When the formation is fractured, the viscous solution will pass out through the fracture in the usual manner. The annular ring of oil will filter into the formation leaving the viscous aqueous fracturing fluid in contact with the formation. After a period of time the viscous fluid will degrade as a result of high formation temperature, of contact with calcium salts in the earth, or of other conditions existing in the fractured formation. The viscosity of the solution will decrease and the resulting liquid will flow back through the fracture into the wellbore. The propping materials, however, will remain in the fracture to hold the fracture open so that formation fluids can freely flow from the formation through the fracture to the wellbore and be produced to the earth's surface therethrough.

With reference now to FIG. 2, there is illustrated a more or less conventional well installation comprising a casing 21 cemented to the surrounding earth formation by a cement sheath 3, and a tubing string 25 suspended from a wellhead in the casing string so as to extend to near the bottom of the well. In this embodiment a low-viscosity, pressurized, aqueous carboxy vinyl polymer solution of pH less than pH 3, formed as described above, is introduced through pipe 27 into the casing string in the annulus around the tubing string 25. The neutralizing agent, which may be any organic or inorganic base or salt capable of adequately raising the pH of the aqueous solution of carboxy vinyl polymer to above pH 4, is introduced into the upper end of the tubing string, and flows therethrough to the lower end of the wellbore. The lower end of the tubing string may be plugged and small perforations provided in the sides thereof near the lower plugged end so that the neutralizing agent is in effect laterally squirted out into the pressurized aqueous solution of carboxy vinyl polymer flowing down the wellbore through the annulus between the tubing string and the casing. Preferably the tubing string termintaes a short distance above the lower end of the casing to ensure adequate mixing of the neutralizing agent and the carboxy vinyl polymer solution so that the pH of the solution may be raised to above pH 4 or pH 5. Almost immediately the solution of carboxy vinyl polymer will become extremely viscous in the same manner as described above with respect to FIG. 1. The viscous solution will be subjected against the earth formation 31 to be fractured through suitable perforations 29 in the casing. The formation will be fractured and the carboxy vinyl polymer solution and the propping agent carried thereby will flow out through the fracture and will subsequently degrade and flow back into the formation in the same manner as described above, leaving the propping agent in the fracture to promote the flow of formation fluids from the formation 31 back into the wellbore.

As indicated above in connection with the embodiment of FIG. 1, it is preferable that high molecular weight amines not be used as the neutralizing agent in connection with the embodiment of FIG. 1. The amine salts of carboxy vinyl polymers act as emulsifying agents and tend to strip the annular stream of oil from the sides of tubular member 11. However, if it be desirable to use such high molecular weight amines, then a sufficient quantity of oil must be injected into the tubular member 11 to ensure the formation of an annular stream around the central highly viscous core.

The fracture propping agents incorporated in the solution of carboxy vinyl polymer may be sand, aluminum pellets, pelletized polypropylene, walnut hulls, or other propping agents known to the prior art.

Having described the principle of the invention and the best modes in which we have contemplated applying that principle, we wish it to be understood that the foregoing description is illustrative only and that the true scope of the invention is defined in the following claims.

We claim:

1. In the fracturing of an earth formation wherein a viscous fluid is injected at high pressure into a formation, the improved method of forming such viscous fluid under high pressure comprising:
   producing a high pressure stream of a solution of a pH-sensitive liquid thickener having a pH to produce a viscosity less than 100 cp.;
   thereafter, and prior to injection of the pressurized stream into the formation, adding to the high pressure stream a pH adjusting agent to increase the pH of the pressurized stream to a pH that will increase the viscosity of the pressurized stream to at least 200 cp.

2. In the fracturing of an earth formation wherein a viscous fluid is injected at high pressure into a formation, the improved method of forming such viscous fluid under high pressure comprising:
   producing a high pressure stream of an aqueous solution of carboxy vinyl polymer, having a pH less than 3;
   prior to injection of the stream into the formation, increasing the pH of the aqueous solution of carboxy vinyl polymer to at least 4.

3. A method in accordance with claim 2 wherein the pH of the carboxy vinyl polymer solution is increased by adding thereto a neutralizing agent therefor selected from the group consisting of inorganic salts and bases, and nonamine organic bases and salts.

4. A method in accordance with claim 2 wherein the carboxy vinyl polymer solution is mixed at the wellhead with a material selected from the group consisting of inorganic bases and salts, and nonamine organic bases and salts.

5. A method in accordance with claim 4 wherein an annular stream of oil is formed between the resulting mixture and the interior of a well pipe for conducting the mixture to the earth formation to be fractured.

6. A method in accordance with claim 2 wherein the carboxy vinyl polymer solution is conducted to the vicinity of the earth formation within one of a pair of well pipes, a neutralizing agent selected from the group comprising salts and bases is conducted to the vicinity of the earth formation in another well pipe, and the carboxy vinyl polymer and the neutralizing agent are mixed immediately before being injected into the earth formation.

7. A method in accordance with claim 2 wherein the aqueous solution of carboxy vinyl polymer has a viscosity of less than 100 cp. when the pH thereof is less than 4, and a viscosity of at least 2000 cp. when the pH thereof is greater than 5.

8. A method in accordance with claim 2 wherein a fracture propping agent is incorporated with the solution of carboxy vinyl polymer.

9. A method in accordance with claim 2 wherein the pH of the carboxy vinyl polymer solution is increased by adding sodium hydroxide thereto.

10. A method in accordance with claim 2 wherein the stream is conducted to the formation in a well pipe, and wherein the pH of the stream is increased at the wellhead, and wherein an annular stream of oil is interposed between the stream of carboxy vinyl polymer solution and the interior of the well pipe.

References Cited

UNITED STATES PATENTS

| | | | |
|---|---|---|---|
| 2,596,843 | 4/1952 | Farris | 166—42.1 |
| 2,668,098 | 2/1954 | Alm | 166—42.1 |
| 2,827,964 | 3/1958 | Sandiford et al. | 166—9 |
| 2,950,760 | 8/1960 | Bernard | 166—9 X |
| 3,039,529 | 6/1962 | McKennon | 166—9 |
| 3,096,284 | 7/1963 | Slate | 166—42.1 X |
| 3,308,885 | 3/1967 | Sandiford | 166—42 X |

JAMES A. LEPPINK, Primary Examiner